March 3, 1931.  C. H. RAMSEY  1,794,496
SPEED CHANGING ASSEMBLY
Filed Dec. 13, 1928  2 Sheets-Sheet 1

WITNESS
W. L. Bell

INVENTOR,
Clifford H. Ramsey,
BY
ATTORNEY.

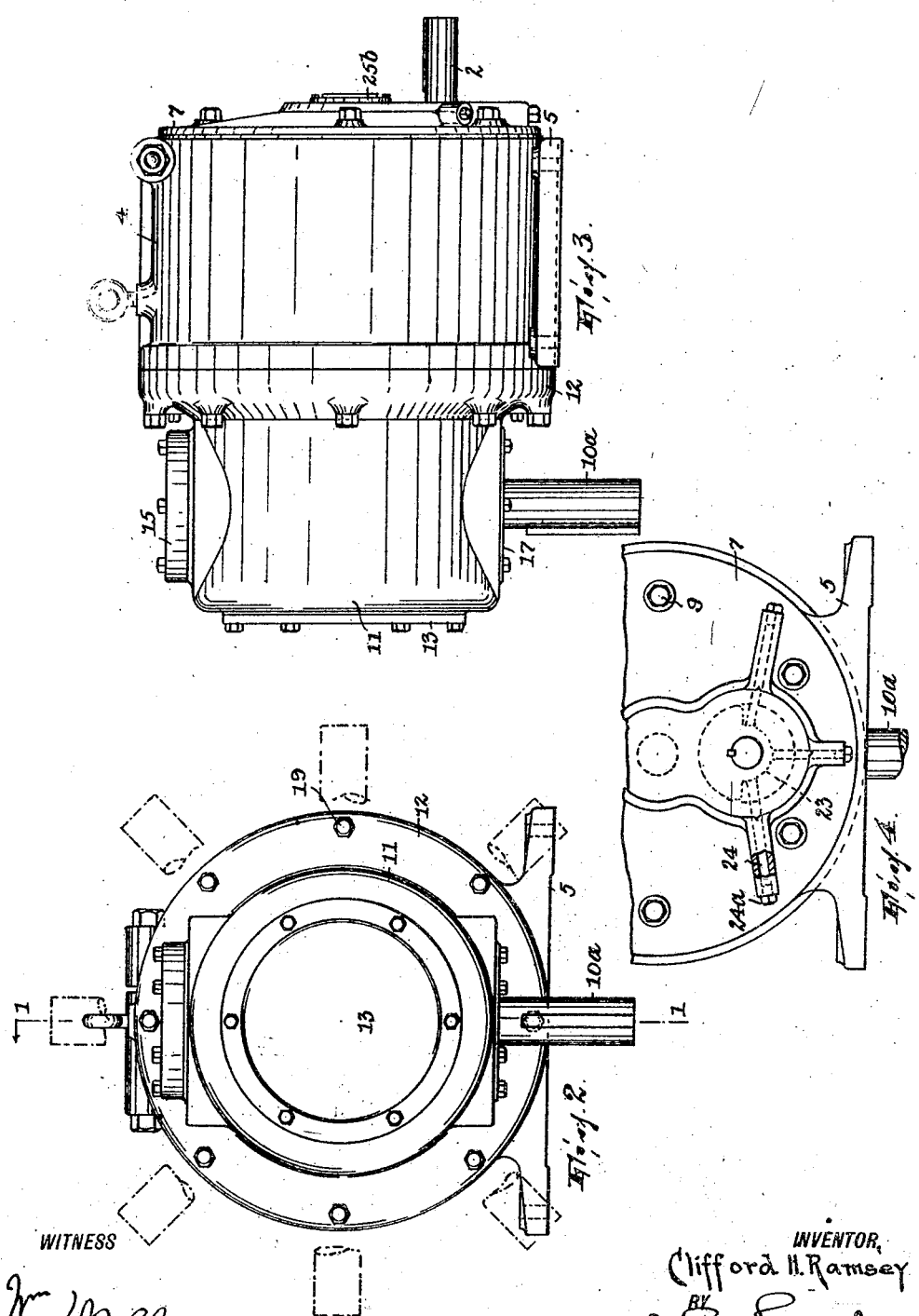

Patented Mar. 3, 1931

1,794,496

UNITED STATES PATENT OFFICE

CLIFFORD H. RAMSEY, OF GLEN ROCK, NEW JERSEY

SPEED-CHANGING ASSEMBLY

Application filed December 13, 1928. Serial No. 325,816.

This invention relates to speed-changing units. One object of the invention is to provide a speed-changing assembly in which a speed-changing unit shall have combined therewith a power-transmission means the axis of whose rotary transmission element shall be angularly related to the axis of one of the intergeared input and output elements of said unit and which means shall be capable of shifting around the axis of the latter element so as to cause change in the direction in which the axis of said transmission means projects. Thus the resulting speed-changing assembly will be adapted for close relation to the machine which it drives or by which it is driven and it may be installed with the transmission means in any plane radial with respect to the shaft or other rotary member of such machine with which it is to be connected as the existing conditions may require. Another object is to provide a speed-changing assembly characterized as above and whose fixed structure in which said elements are journaled may form a receptacle for lubricant for the latter, and thereupon to make it possible for the speed-changing means of said unit to cause proper lubrication of said element of the transmission means in any position to which said means is rotatively shifted and avoid loss of lubricant whatever such position may be.

In the drawings,

Fig. 2 is a left-hand end elevation thereof;

Fig. 3 a side elevation; and

Figure 1:
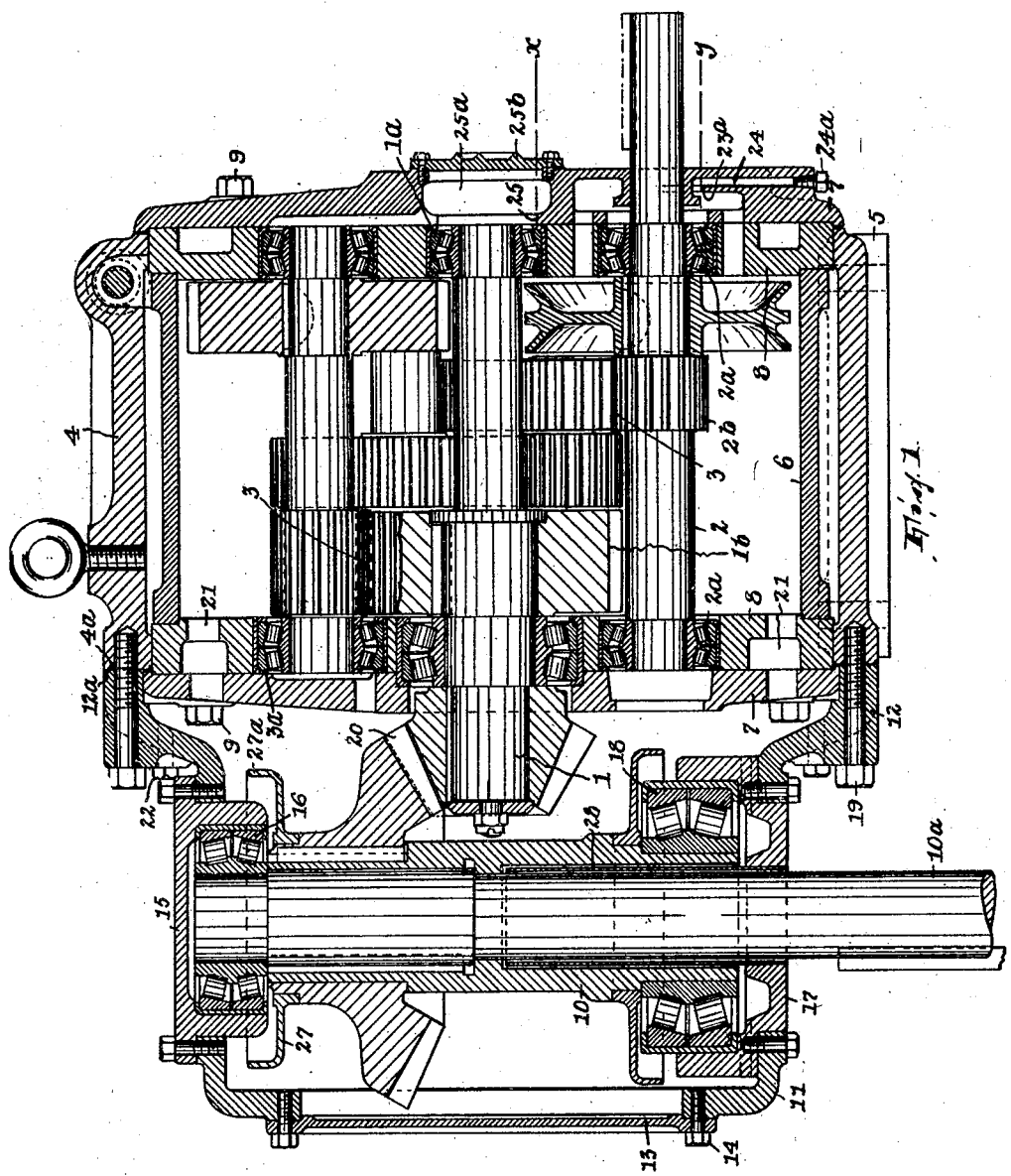
Fig. 1 is a longitudinal vertical section of the assembly on line 1—1, Fig. 2.

Fig. 4 shows a detail.

1 and 2 are the rotary elements of the speed-changing unit intergeared as at 3 and forming one the input and the other the output. The casing within which the parts constituted by said elements and the gearing are journaled is generally cylindrical and is here constructed in accordance with the principle of the unit set forth in my Patent No. 1,393,906, to wit: In and by the band 4 of a support having a base 5 is clamped a box or hollow carrier here comprising a cylindrical shell 6, two disks 7 opposite the ends of the shell and two heads 8 (each head and disk forming one of the casing end walls and affording bearings 1a, 2a and 3a for the aforesaid parts) each interposed between the shell and a disk, all these being held together in any secure manner, as by screws 9. Element 1 is here coaxial with the casing. (This specific construction of the casing is not material in accordance with my first mentioned object of invention). The casing may have, concentric with one of the elements 1 and 2 (here, with element 1, which in the example is coaxial with the casing) and on one of its ends, a surface 4a planed off smooth.

10 is the revoluble transmission element, having here a shaft. The support therefor is here constructed as follows: As shown it is a hollow generally cylindrical box or housing 11 at one side open and having a flaring concentric circular flange 12 around the opening and whose free edge 12a is of the same diameter as the circular planed surface 4a and is planed off smooth; an opening opposite the first opening and covered by a plate 13, which may be removably held thereto, as by screws 14; and two other openings opposite each other and opening at right angles to the first-named openings, one of these having a cap 15 affording an end-bearing at 16 for element 10 and the other having an annular closure 17 affording a through-bearing at 18 for said element. (In order to provide an assembly characterized in accordance with my first object of invention it will appear that the mentioned structural details of the support are immaterial).

When the speed-changing unit and transmission means are assembled their relation is such that the axis of element 10 is angularly related to (here at right angles to and in a plane actually coincident with) that of element 1. Further, the transmission means is rotatively shiftable about the axis of element 1 for the purpose hereinbefore set forth, for which purpose the planed-off edge 12a of flange 12 bears against the planed-off surface 4a of the casing.

To secure said means to the unit in any of different positions to which it is thus rotatively shiftable (see the dotted positions of portion 10a of element 10 in Fig. 2) screws 19 may be passed through flange 12 and into equidistantly spaced holes tapped into the casing at its surface 4a.

At 20 is indicated gearing (here bevel gearing) connecting elements 1 and 10.

If, as in the construction shown, the support for element 10 is arranged so as to be penetrated centrally of itself by the axis of the element to which element 10 is connected by gearing 20, and if, further, the element to which it is thus connected is central of the casing, there will follow the additional advantage that in any position of the transmission means relatively to the speed-changing unit the whole assembly will have a desirably compact and symmetrical form.

The speed-changing unit is the lubricant distributor of the entire assembly. Its casing and the hollow support or housing 11 form a container for the (liquid) lubricant, which on displacement therefrom into the housing tends to flow back into the casing because the bottom of the latter is lower than that of the housing in any position to which the latter may be shifted; the circulation thus possible is permitted by holes 21 in the end wall of the casing adjoining the support and arranged equidistantly in a circle concentric with the casing (Figs. 1 and 2). (At 22 are removable plugs similarly arranged in flange 12 and closing holes by which the lubricant is introduced.) All structure of the unit which is held in and by band 4 is rotatively shiftable in the band, as in my said patent; and in view of this the liquid level to which the said container should be filled is such that whichever of the elements 1 and 2 is the lower that element will dip into it without the lubricant escaping at the bearing (1a or 2a), or exceeding the level marked $x$ for element 1 and $y$ for element 2, for which purpose the opening 23 outward of the bearing 2a is formed by an arcuate overflow lip 23a and radial drain-holes 24 having removable plugs 24a, and the opening 25 outward of bearing 1a is formed as a circular overflow lip 25a and has a removable cover 25b. When the moving internal mechanism of the unit is in action it acts to throw the lubricant upwardly and about within the casing, and some of this is impelled through the holes 21 (even the highest of them) into the interior of support 11.

Due to the interiorly cylindrical form of the casing there is the further advantage that in any position to which the casing itself may be adjusted relatively to the housing the level predetermined as above (i. e., according to which shaft is the lower) will remain the same.

This part of my invention contemplates that a member of the rotary speed-changing means within the casing shall have its axis substantially horizontal; that the housing for the transmission element shall be rotatively shiftable relatively to the casing around said axis, and that the casing and housing shall form a container for a liquid lubricant body in which said means shall be immersed and shall have inter-communication above and below said axis in any position to which the housing is so shifted, whereby the lubricant projected by said means may in any such position of the housing enter the latter above, and return therefrom into the casing below, said axis.

The lubricant thus entering the housing should reach all points (16, 18 and 20) within the same requiring lubrication whatever the position to which the transmitting means is rotatively shifted and whichever of the two aforesaid levels is maintained. This occurs, as to the gearing 20 and as to whichever of the bearings 16—18 happens to be the lower when the axis of element 10 is more or less upright, by the lubricant impelled through holes 21 falling on these parts (the lower bearing being at such time in fact immersed whether the level be one or the other of those indicated and the gearing being also immersed when the level is the higher one); and it occurs also as to the gearing and both bearings when the axis of element 10 more or less approaches the horizontal. In order to insure the upper bearing of element 10 receiving an adequate supply of lubricant when said element is upright I provide said element with catch-wells 27, between said axis and the respective bearings 16—18, which have flanges 27a which project from each other and partially receive the bearings, being spaced from the inwardly projecting part of the cap 15 and closure 17; in consequence, that catch-well which happens to be the upper one receives and holds some of the lubricant thrown over into the housing through holes 21, in which lubricant the corresponding bearing becomes immersed. Thus in any position of the transmission means and regardless of the level in the casing all parts of the assembly are adequately lubricated.

A sleeve 28 tightly fits the aperture of the closure 17, surrounding that portion 10a of element 10 which is here shown as in fact a shaft keyed in the remainder or housed part of said element and protrudes from the closure, and reaches into the housing higher, when the portion 10a of said element projects downwardly, than the then lowest peripheral part of the means 1—2—3 (as the teeth 2b of element 2 or the teeth 1b of element 1) and has its radial extent less than that between said part and the axis of member 1. Thus the lubricant is kept from escape at closure 17 whatever the position of the transmission means and whichever level is maintained.

Having thus fully described my invention, what I claim is:

1. The combination, with a speed-changing unit including a support, a carrier revolubly shiftable therein around an axis penetrating the carrier, and intergeared input and output members journaled in the carrier on axes extending lengthwise of the first axis, of another support attached to the first support and shiftable thereon around an axis also extending lengthwise of the first axis, and a rotary transmission element journaled in the second support and geared with one of said members and extending in angular relation to the axis thereof.

2. The combination, with a speed-changing unit including a support, a carrier revolubly shiftable therein around a sustantially horizontal axis penetrating the carrier, and intergeared input and output members journaled in the carrier on substantially horizontal axes, of another support attached to the first support and shiftable thereon around a substantially horizontal axis, and a rotary transmission element journaled in the second support and geared with one of said members and extending in angular relation to the axis thereof, said supports having intercommunicating spaces forming a lubricant container and housing said members and the intergeared portions of said element and the member with which it is geared.

3. In a speed-changing assembly, the combination of a casing having upright opposite end walls, rotary speed-changing means journaled in said walls within the casing, a closed housing attached to the casing outward of one end wall thereof and rotatively shiftable relatively to the casing around a substantially horizontal axis penetrating said walls, and a rotary transmission element having bearings, and being intergeared with said means, within the housing and protruding therefrom and extending in angular relation to said axis, said casing and housing together forming a container for a liquid lubricant body in which said means is immersed and having communication with each other through said end wall above and below said axis in any position to which the housing is shifted.

4. In a speed-changing assembly, the combination of a casing, a rotary speed-changing means therein, a closed housing attached to the casing and rotatively shiftable relatively thereto around a substantially horizontal axis, a rotary transmission element having spaced bearings, and being intergeared with said member, within the housing and protruding therefrom and extending in substantially perpendicular relation to said axis, said casing and housing together forming a container for a liquid lubricant in which said means is immersed and having means to permit lubricant projected by said speed-changing means to enter the housing above said axis, and a lubricant well surrounding said element and receiving one such bearing and when the housing is positioned with said bearing above the other bearing being arranged to receive the lubricant so projected into the housing.

5. In a speed-changing assembly, the combination of a casing, rotary speed-changing means therein, a closed housing attached to the casing and rotatively shiftable relatively thereto around a substantially horizontal axis, and a rotary transmission element intergeared with said member and journaled in the housing and protruding therefrom and extending in angular relation to said axis, said casing and housing together forming a container for a liquid lubricant body into which a peripheral part of said means may depend and having communication with each other below said axis in any position to which the housing is shifted, and said housing having an interior lubricant barrier surrounding said element and reaching higher when said element projects downward than said part so depends and having its radial extent less than that between said part and axis.

6. A speed-changing assembly including, in combination, an interiorly substantially cylindrical casing having its axis substantially horizontal, rotary speed-changing means therein, a housing attached to the casing, and a rotary transmission element journaled, and being intergeared with said means, within the housing and protruding therefrom and extending in angular relation to said axis, said casing being shiftable around said axis relatively to the housing and said casing and housing together forming a container for a liquid lubricant body in which said means is immersed and communicating with each other below said axis in any position to which the casing is rotatively shifted.

In testimony whereof I affix my signature.

CLIFFORD H. RAMSEY.